July 19, 1966 A. E. FUHS 3,262,052
CONDUCTIVITY PROFILE METER ARRANGEMENT
Filed Jan. 2, 1962

ALLEN E. FUHS
INVENTOR.

BY David P. Ogden

ATTORNEY

United States Patent Office 3,262,052
Patented July 19, 1966

3,262,052
CONDUCTIVITY PROFILE METER
ARRANGEMENT
Allen E. Fuhs, Palos Verdes Estates, Calif., assignor to
The Aerospace Corporation, Los Angeles, Calif., a corporation of California
Filed Jan. 2, 1962, Ser. No. 163,485
10 Claims. (Cl. 324—34)

This invention relates to a conductivity profile meter arrangement, and more particularly to a detecting apparatus for measuring the relative conductivity of a volume containing moving conductive material, such as plasma.

When gaseous material is raised to a high temperature or when particles of gas are rapidly accelerated, the resulting high energy gas becomes partially ionized. Ionized gas, sometimes referred to as plasma, is capable of carrying electric current in accordance with the degree of ionization. The ionization of gases may occur in several ways. However, particular problems arise in the field of magnetohydrodynamics such as vehicular re-entry, in the generation of a plasma sheath about high velocity vehicles passing through the atmosphere. Although the development of plasma in connection with magnetohydrodynamics or re-entry of missiles is recognized, the velocity and conductivity of such plasma have not been thoroughly studied whereby the development of useful application or countermeasures has been difficult.

As the detailed study of plasma progresses, not only is it essential to be able to detect the existence of conductive plasma but also it is most desirable to be able to detect the character of the plasma, such as its velocity-electrical conductivity profile. With such a profile, by using calculations for the velocity profile, the electric conductivity profile is readily obtained. It would be particularly advantageous to obtain in-flight velocity-electrical conductive profile of re-entry vehicles. Such information will yield valuable data to assist in answering questions concerning telemetry blackout, magnetoaerodynamic attitude control and will probably be useful in the study of hypersonic flow at large angles of attack and the influence of relaxation phenomena. Furthermore, such a profile may yield valuable information and insight concerning the influence of ablating material on the electrical properties of a plasma sheath.

Therefore, the primary object of the present invention is to provide an improved arrangement for determining the velocity-electrical conductivity profile of a conductive medium.

A further object is to provide an arrangement developing an electrical conductivity profile of a conductive medium.

In accordance with one embodiment of the present invention, a plurality of coils are simultaneously energized with different low frequency power signals so that they develop concentric flux excursions into the region of expected plasma flow. The configuration of the coils is such that the flux excursions extend varying distances into the plasma flow region. A sensing coil arrangement is positioned to be energized only as a function of the distortion of the flux because of the moving plasma. The signals from the sensing coil arrangement are then electronically sorted and analyzed to determine the relative velocity-electrical conductivity profile of the plasma throughout the region under surveillance.

The subject matter which is regarded as this invention is particularly pointed out and distinctly claimed in the concluding portion of this specification. The invention, however, as to organization and operation, together with further objects and advantages thereof, will best be understood by reference to the following description taken in connection with the accompanying drawing in which:

Figure 1:
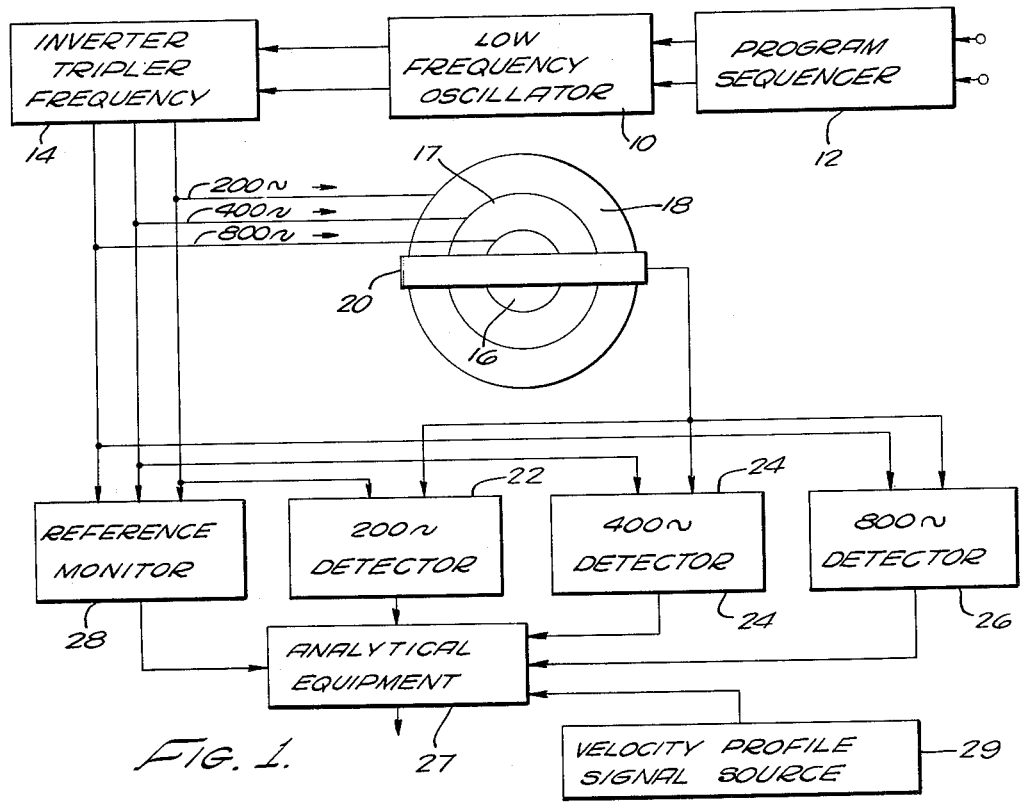
FIG. 1 is a block diagram illustrating the main components of the present invention.

Referring now to the drawing, wherein like numerals refer to similar parts, in FIG. 1, a low frequency oscillator 10 is energized in accordance with the program provided thereto, by way of example, from a program sequencer 12. The low frequency oscillator 10 provides a power output signal having frequency such as 200 cycles per second to a circuit referred to herein as an inverter tripler circuit 14 having output power signals at frequencies of 200 cycles, 400 cycles and 800 cycles. In environments where continuous signals may be used, a simple power supply having three distinct output signals will suffice. These power signals are applied selectively to a complex primary coil arrangement including concentric coils 16, 17 and 18. For the purpose of simplifying the discussion, it may be assumed that the coils 16, 17 and 18 have similar numbers of turns and are energized so that the ampere turn functions thereof are identical.

Wound in a balanced location relative to the coils 16, 17 and 18 is a sensing coil arrangement 20 positioned so that, in the absence of a moving conductor in proximity therewith, no signal will flow through the sensing coil arrangement 20 because of the energization of any or all of the coils 16, 17 and 18. However, when a moving conductor or other conductive matter passes through the region energized by the primary coils 16, 17 and 18, it will induce changes in the flux patterns which in turn induce current flow in the sensing coil arrangement 20. These induced currents pass selectively to interpretive equipment including the detectors 22, 24 and 26. One simple detector arrangement uses sychronized detectors receptive selectively of the primary power signals whereby the detector 22 will be sensitive to both the magnitude and phase of the 200 cycle energization of the sensing coil arrangement 20, the detector 24 will be sensitive to the 400 cycle signal and the detector 26 will be sensitive to the 800 cycle signal.

The output from these detectors is supplied to other analytical equipment 27 consistent with the particular function of the overall system. When used for plasma sheath detection in rocket re-entry vehicles, the output of these detectors will be applied selectively to telemetry channels which in turn supply the signals to the analytical equipment 27. Usually the analytical equipment 27 will include large computers at ground installations. For the purposes of the present invention the details of the electronic interpretive equipment circuitry need not be set forth, as the functions, although complex, may be accomplished by existing circuitry. For instance, the output signals of the detectors 22, 24 and 26 might be coherently stored on magnetic tape to allow a repetitive analytical programming. Although these signals may be visually shown on cathode ray tubes, the analytical programming usually entails more precise signal comparison.

A fourth telemetry channel such as a reference monitor 28 is energized in accordance with the program sequencer 12 or more directly as a function of the power applied to each of the primary coils 16, 17 and 18 to provide information relative to the magnitude and phase of the primary energization of the coils 16, 17 and 18. Moreover, other information may be desired and available. For instance, when it is useful to obtain the electrical conductivity profile in environments where the velocity profile is obtainable, a velocity profile signal is applied to the analytcial equipment 27 from a velocity profile signal source 29. One of several "difference" electronic circuits will effectively cancel out the velocity profile to obtain the electrical conductivity profile. This information is particularly useful in studies of the relative conductivity of various ablation vapors. Moreover, in laboratory studies of ablation vapors, the relative merit of numerous configurations may be analyzed.

Figure 2:
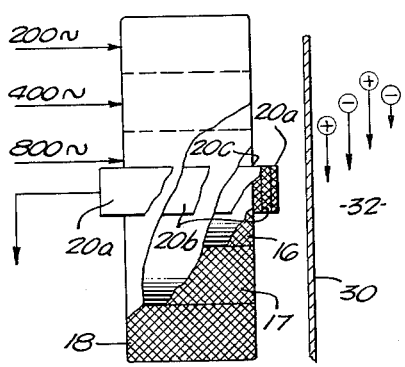
FIG. 2 is a side-plan view partially cut away of a coil arrangement useful in the present invention.

The operation of the present invention on a re-entry vehicle will be more clearly understood by reference to FIG. 2 wherein the location of the coils relative to a missile skin surface 30 is shown. The missile skin will usually be of conductive material such as aluminum. However, if the primary power signals are of a high enough frequency so that eddy currents and the like will disrupt the signal information, an insulation window is used. Higher frequencies have electronic advantages in applications where the precise LC filters are desired to help sort the signals. A plasma 32 flowing on one side of the skin surface 30 will induce current flow in the sensing coil arrangement 20 in accordance with the primary fields flux patterns in the region of the plasma. Because of the relative geometry of the coils 16, 17 and 18, the flux excursions produced by the coil 18 probe a relatively greater distance than those produced by the coil 16. Thus, the velocity-electrical conductivity profile in a portion of the region under surveillance and remote from the skin surface 30 will have more influence on the 200 cycle signal than on the 800 cycle signal.

Figure 3:
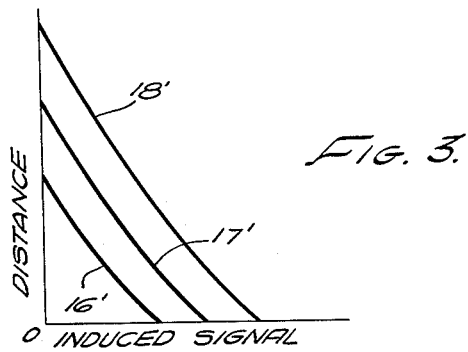
FIGS. 3 and 4 are curves illustrating the relative signals induced by the different primary coils of the present invention.

This phenomena is more clearly illustrated in FIG. 3 which has an an axis of ordinates the distance from the coils to a unit plasma layer and an axis of abscissas the induced signal per unit plasma layer. Each portion of the region under surveillance may be referred to as a unit plasma layer which is defined as a layer with unit thickness, unit velocity and unit electrical conductivity. As the unit plasma layer is moved farther away from the sensing coil arrangement 20, the signal decreases. It decreases more rapidly for the smaller primary coil 16 as curve 16′ shows. The distortion of the field of the larger primary coil 17 will induce substantially larger signals and will sense the plasma flow farther from the skin surface 30, as illustrated by the curve 17′. Similarly the primary coil 18, having the largest diameter, will induce even larger signals and will induce signals, because of plasma conductivity, further from the skin surface 30. Thus the effective distance, or probe distance of each primary coil is different. The magnitude of the signals sensed are basically proportioned to the areas the under the curves 16′, 17′ and 18′. As illustrated the relative areas under the curves 16′, 17′ and 18′ may be about 10:20:40, for a particular size primary coil arrangement. However, an even more useful feature of my invention comes into play when the velocity-electrical conductivity profile is other than uniform.

Figure 4:
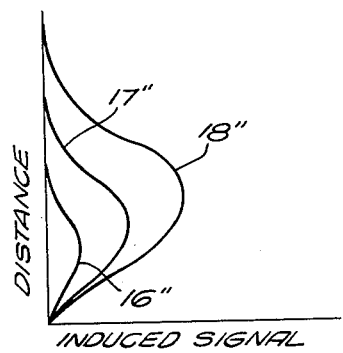

Referring now to FIG. 4, assume that the only change in parameters is that the velocity-electrical conductivity profile is zero at the skin surface 30 and at consecutive unit distances from the skin surface 30 is respectively 1, 3, 7, 10, 12, 14, 8, 4, 2, 0 with the maximum value (14) falling at the point of maximum range of coil 16. Now the profile signals will have a substantially different shape and a substantially different area thereunder. The signals are shown by the curves 16″, 17″ and 18″ in FIG. 4, and the relative areas are 3:10:18. On the other hand, if the velocity-electrical conductivity signal were generated by plasma flow only within the first unit distance (at the surface) the relative area is about 2:3:4. One only has to compare the magnitude of the signals as represented by the relative areas above illustrated to recognize the fact that information is provided concerning both the total magnitude of the velocity-electrical conductivity profile characteristic as well as its relative concentration in terms of distance from the skin surface 30.

However, the present invention may be used to provide six additional signals by the addition of a relatively small amount of weight. Since most of the power of the system is used in energizing the primary coils to influence any plasma in the region of the skin surface 30, these coils are many times heavier than the sensing coil arrangement and the detectors. Thus, although a single sensing coil may be used and connected as illustrated in FIGS. 1, 3 and 4, a plurality of sensing coils 20a, 20b, and 20c as shown in FIG. 2, will provide greater signal differentiation. For instance, the coil 20a is arranged to encompass all of the other coils, the coil 20b encompasses coils 16 and 17, and coil 20c encompasses only coil 16. By selectively sensing the induced signals in the coil arrangement 20a, 20b and 20c as many as nine distinct signals are obtainable. Obviously by using known mathematical-electronic techniques these nine signals will provide far more precise signal information, including indications of malfunction of one or more of the elements of the system. When nine signals are available a more sophisticated equipment uses nine detectors (22a, 22b etc.). However, rapid sequential sampling will provide a similar profile signal, even when it is changing at a fairly rapid rate.

While I have shown and described particular embodiments of my invention, other modifications may occur to those skilled in the art. For instance two, or four primary and/or sensing coils may be used and the coil configurations may be quite different than those illustrated. Moreover, when two or more of these conductivity profile meter arrangements are placed annularly around the nose of a rocket vehicle, they will provide signal information of a plurality of quadrants of the penetration region. With a uniform concave nose cone, any difference in this signal information will indicate an angle of attack of a re-entry vehicle or hypersonic atmospherical vehicle. In the case of a more complex nose arrangement, the angle of attack may still be extrapolated from a plurality of such signals. It is intended, therefore, by the appended claims to cover all such modifications as come within the true spirit and scope of the present invention.

I claim:

1. A meter arrangement for indicating the velocity-conductivity profile of matter moving in a region adjacent thereto comprising:
    means establishing a magnetic flux field throughout the region under surveillance;
    a plurality of nested sensing coil means each of a different diameter each deriving a signal in response to the disturbance of the flux field at a predetermined and different distance into the flux field; and
    means coupled to and receiving the signals from the sensing means and providing an ouput signal indicative of the profile of the velocity-conductivity characteristics of the moving matter.

2. A conductivity-profile meter for developing an indication of the velocity-electrical conductivity profile of matter in a region adjacent thereto, comprising:
    a pair of nested coils each having a different diameter and being energizable to provide coaxial, geometrically different flux patterns, each of which probe mutually distinct zones of the region and each of which will be disturbed primarily by the motion of any conductive matter in that zone of the region which it probes;
    means energizing one coil of said pair at a first frequency and energizing the other coil of said pair at a second frequency;
    sensing coil means oriented with respect to said pair of coils to be sensitive to any disturbance caused by motion of conductive matter in the flux patterns produced by said pair; and
    interpretive equipment including signal sorting means coupled to said sensing coil means and providing output signals indicative of the distortion of each flux pattern of the coils.

3. A conductivity profile meter for developing an indication of the velocity-electrical conductivity profile of matter in a region adjacent thereto, comprising:

a pair of nested coils each having a different diameter and being energizable to provide coaxial, geometrically different flux patterns which probe mutually distinct zones of the region and each of which will be disturbed primarily by the motion of any conductive matter in that zone of the region which it probes;

means energizing each coil of said pair at a frequency distinct from the frequency of the other coil of said pair;

sensing means adjacent to the region and being oriented to respond to any flux pattern disturbance in the zone under surveillance of each of said pair; and means coupled to the sensing means having outputs indicative of the flux pattern disturbance of each of the coaxial flux patterns whereby such profile is established.

4. A conductivity profile meter for developing an indication of the velocity-electrical conductivity profile of matter in a region adjacent thereto, comprising:

a plurality of primary coils, each of said coils being energized by alternating current at a different frequency and each of said coils having a different diameter to produce a geometrically distinct flux pattern that probes the region at a different distance from the coils, said flux patterns being disturbed primarily by the motion of any conductive matter in the region at that distance from the coils;

a plurality of sensing coils adjacent to the region and sensing any flux pattern disturbance in the region under surveillance of each of said primary coils; and means coupled to said sensing coils having an output indicative of the flux pattern disturbance in the fields of each of the primary coils.

5. A conductivity profile meter for developing an indication of the velocity-electrical conductivity profile of matter in a region adjacent thereto, comprising:

a plurality of concentric primary coils each having a different diameter and each being energized at a distinct frequency to establish geometrically different coaxial flux patterns which probe the region at different distances from the coils and which will be disturbed by the motion of any conductive matter in the region;

sensing coil means oriented to be sensitive to any disturbance in the flux patterns caused by motion of conductive matter in each portion of the region energized by each of said plurality and providing output signals varying as a function of the disturbance; and interpretive equipment coupled to the sensing coil and receiving said signals to sort, analyze and develop signal information indicative of the distortion of each of the coaxial flux patterns.

6. A conductivity profile meter for developing an indication of the velocity-electrical conductivity profile of matter in a region adjacent thereto, comprising:

a plurality of nested primary coils each of a different diameter and being energized at a different frequency to provide frequency distinguishable geometrically different coaxial flux patterns each of which probes the region at a different distance from the coils and which will be disturbed by the motion of any conductive matter in the region;

a plurality of sensing coils adjacent to the region and sensing any flux pattern disturbance in the region under surveillance of each of said sensing coils; and circuit means coupled to said primary coils and to said sensing coils to sort coherently any signals developed in said sensing coils.

7. A meter for developing an indication of the electrical conductivity profile of matter in a region adjacent thereto and having a known velocity profile, comprising:

a plurality of nested concentric primary coils, each of said coils having a different diameter and being energized at a different frequency to provide distinguishable coaxial flux patterns which probe the region at different distances from the coils and which will be disturbed by the motion of any conductive matter in the region;

a sensing coil sensitive to any disturbance in the flux patterns caused by motion of conductive matter in each portion of the region energized by each of said plurality for developing signals as a function of the disturbance;

interpretive equipment coupled to the sensing coil and receiving said signals to sort, analyze and develop signal information indicative of the relative distortion of each of the coaxial flux patterns;

a source of velocity profile signal information; and analytical equipment coupled to the interpretive equipment and said source, and receiving the distortion signal information and the velocity profile signal information to provide the electrical conductivity profile signal information.

8. A conductivity profile meter for developing a signal indicative of the velocity-electrical conductivity profile of matter in a region adjacent thereto, comprising:

a plurality of nested primary coils each having a different diameter and each being energized at a different frequency to provide distinguishable coaxial flux patterns each of which probes the region at a different distance from the coils and each of which will be disturbed by the motion of any conductive matter in a portion of the region energized;

oscillator means coupled for energizing said primary coils;

programming means coupled to and controlling said oscillator means;

a plurality of sensing coils adjacent to the region and sensing any flux pattern disturbance in the region energized by each of said primary coils;

detector circuit means selectively coupled to said primary coils and to said sensing coils to sort any signals developed in said sensing coils as a coherent function of the operation of said oscillator means; and electrical analytical equipment coupled to the detector circuit means for developing the velocity-electrical conductivity profile signal information comparing the flux pattern disturbance of each of the flux patterns.

9. A meter for developing a signal indicative of the electrical conductivity profile of matter in a region adjacent thereto and having a known velocity profile, comprising:

a plurality of concentric primary coils each having a different diameter and being energized at a different frequency to provide frequency distinguishable coaxial geometrically different flux paterns which probe the region at different distances from the coils and which will be disturbed by the motion of any conductive matter in the region;

a plurality of sensing coils each being sensitive to any disturbance in the flux patterns caused by motion of conductive matter in each portion of the region under surveillance for developing signals as a function of the disturbance;

interpretive equipment coupled to the sensing coils for receiving and combining said signals and with another signal indicative of the energy supplied to said primary coils to sort, analyze and develop signal information indicative of the distortion of each of the coaxial flux patterns;

a source of velocity profile signal information; and analytical equipment combining the distortion signal information and the velocity profile signal information to provide the electrical conducivity profile signal.

10. A meter for developing a signal indicative of the velocity-electrical conductivity profile of matter in a region adjacent thereto, comprising:
 a plurality of coaxial primary coils each having a different diameter and being energized at a different frequency to provide frequency distinguishable flux patterns each of which probes a different zone of the region under surveillance and each of which will be disturbed by the motion of any conductive matter in that zone of the region energized; and
 a sensing coil which is sensitive to any disturbance in the flux patterns caused by motion of conductive matter in each zone of the region energized for developing frequency distinguishable signals as a function of the disturbance of each flux pattern.

References Cited by the Examiner

UNITED STATES PATENTS 2,955,250  10/1960  La Motte Shaw et al. __ 324—34

OTHER REFERENCES

"Magnetic Tachometer" (Berkin), IBM Technical Disclosure Bulletin, vol. 3, No. 3, pub. date August 1960, page 74.

"The Measurement of Sea-Water Velocities by Electromagnetic Induction" (Guelke et al.), The Journal of the Institution of Electrical Engineers, vol. 94, parts 2 and 3, pub. date 1947, pages 71–74.

WALTER L. CARLSON, *Primary Examiner.*

FREDERICK M. STRADER, C. W. HOFFMANN, M. J. LYNCH, *Examiners.*